Sept. 4, 1923.
A. DE MEURISSE
DISPLAY DEVICE
Filed Sept. 30, 1922
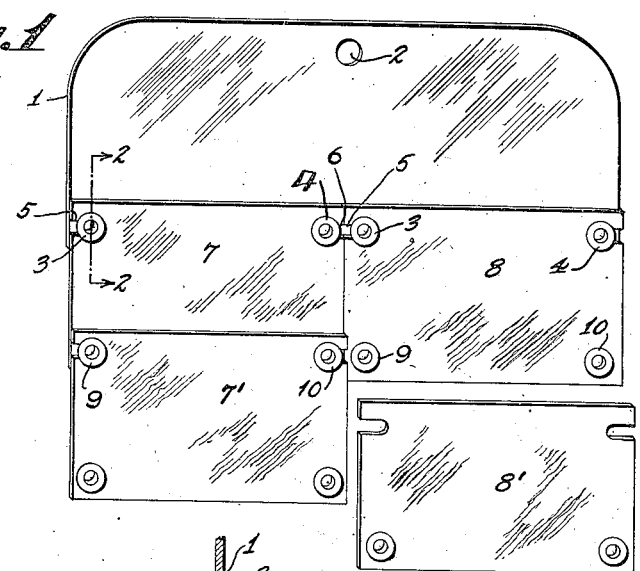
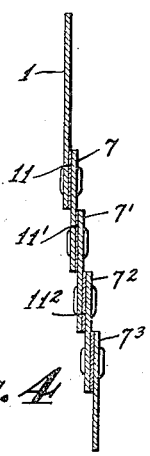
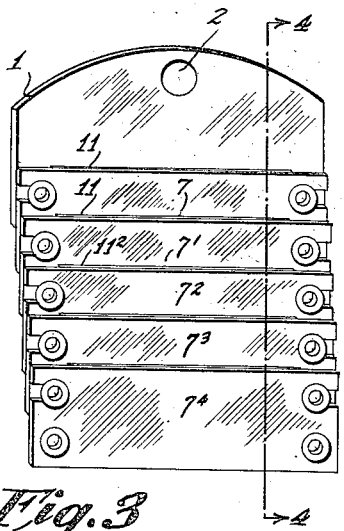
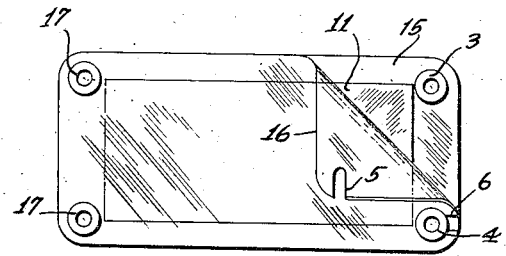
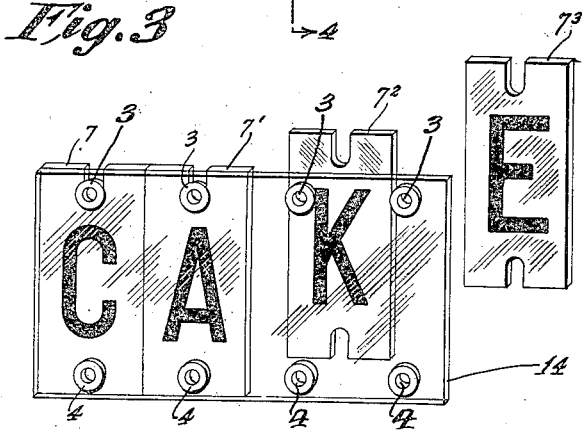
INVENTOR.
Alfred de Meurisse
BY
ATTORNEYS.

Patented Sept. 4, 1923.

1,467,140

UNITED STATES PATENT OFFICE.

ALFRED DE MEURISSE, OF NEW YORK, N. Y.

DISPLAY DEVICE.

Application filed September 30, 1922. Serial No. 591,483.

*To all whom it may concern:*

Be it known that I, ALFRED DE MEURISSE, a citizen of the United States, residing in New York city, county and State of New York, have invented a certain new and useful Display Device, of which the following is a specification.

This invention is a display device and embodies a novel interlocking system of parts, whereby different parts of the device may be readily, expeditiously and detachably maintained in cooperative relation with one another, but are so constituted that they may be readily removed from one another. The structural features underlying the present invention adapt it for general use, such for example as address lists, membership lists, telephone, directory lists, restaurant menus, display cards for merchandise, as well as innumerable other devices wherein it is desirable to secure certain parts of a construction in a readily detachable manner to other parts thereof.

The invention particularly resides in securing different parts to one another in a readily detachable manner, and is also directed to novel assemblages of such parts to enable them collectively to carry out different utilitarian purposes.

In all the various embodiments of which the invention is susceptible the construction as a whole comprises at least two parts or elements detachably associated with one another by novel and efficient means to enable said parts to be readily separated or dismantled. If, for example, the two parts referred to are assumed to be two cards, one of such cards is provided with at least two headed studs and this part may be rigid. The other part is flexible and preferably springy or resilient such, for example, as light cardboard, celluloid or the like, and this flexible part is provided with a slot adapted to engage with the shank of one of the studs between the rigid part and the head of such stud. The other stud engages with the resilient part either in a slot of the same character as the first mentioned slot, and in the same manner, or, the shank of the stud may pass through a perforation in the resilient part so that the head will lie beyond the outside face of the resilient part. If the resilient part is provided with a pair of slots, as described, it may be flexed so that said slots may be brought into a position to straddle the shanks of both studs for the purpose of mounting the resilient part in a bodily detachable manner upon the rigid part, whereas, if only one slot and a perforation is formed in the resilient part, the resilient and rigid parts will be secured together by the stud which passes through the perforation, but, by flexing the resilient part, the slot may be removed from the other stud to release the corresponding portion of the resilient part from such stud. The studs referred to may be in the form of rivets, eyelets, grommets, screws, nails or other similar expedients so long as they are permanently secured to one part and project therefrom to form a shank which is provided with a head at its free end.

In one of its preferred practical forms, the invention embodies a plurality of elongated strips, each of which is provided in its two upper corners with slots which extend inwardly from the opposite ends of the strip and provided at each of its lower corners with a headed stud which projects beyond the front face of the strip. Any number of such strips may be assembled and detachably maintained in assembled relation by flexing the successive strip to bring the slots of each strip into cooperative relation with the studs of the preceding strip and by this manner of assembling the strips may be built, one on the other, and to an assembly of any desired length, and which assembly may be supported or suspended from the top strip. In practically utilizing such a construction, the successive strips may be each utilized to receive a telephone number, an address, or a name, or such successive strips may separately support different articles of merchandise to be vended, it being obvious that the strips may be successively dismantled from one another, or that any strip, intermediate the ends of the assembly, may be removed and the remaining parts reassembled without requiring a complete dismantling of the strips.

In another of its practical embodiments, a number of flexible or resilient strips, slotted at their opposite ends, may be adapted to cooperate with twice the number of suitably spaced studs associated with either a single flexible or rigid part, such for example as a sheet of celluloid or glass, so that when the strips are associated with the glass or celluloid, they will form a sign which can be read through the transparent glass or celluloid. The invention is capable of many other embodiments, but the foregoing are exemplary.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as describing the limits of the invention.

Figure 1 shows a display device embodying the present invention.

Figure 2 is a section on the line 2—2 of Figure 1.

Figure 3 illustrates a slightly modified form of construction.

Figure 4 is a section on the line 4—4 of Figure 3; and,

Figures 5 and 6 illustrate further modified forms of construction.

In Figures 1 and 2 of the drawing I have shown the invention in an embodiment which may be used to advantage either as a telephone device or for alterable listings of telephone numbers, addresses, names, etc.

The assembly as shown in Figure 1 embodies a permanent head-piece 1 which, in practice, may constitute a display card. This card may be expensively prepared, embossed, or otherwise provided with pictorial illustrations or other suitable advertising matter, and serves as a support or suspension member on which the cards or strips are mounted. The head piece 1 may be supported in any suitable manner but as shown is provided with a perforation 2, whereby it may be suspended on a nail. Along the lower margin of the head piece 1, and projecting forwardly from the front face thereof, are four studs 3—4, 3—4, which constitute two pairs, and the studs of each pair are spaced at equal distances apart. In practice, these studs may be formed in any suitable way, so long as they embody a headed shank adapted to project beyond the front face of the head piece 1. I have found that eyelets, such as shown in these figures of the drawings, are economical and thoroughly satisfactory for their intended purposes. The eyelets are secured to the head piece 1 in such manner that they project beyond the front face thereof, as illustrated in Figure 2, whereby their shanks are adapted to be straddled by slots 5 and 6 formed in the opposite lateral edges of strips or cards 7 and 8. The strips or cards are of springy or flexible material such, for example, as light cardboard and the slots 5 and 6 extend towards one another from the lateral edges of these cards and adjacent the upper edges thereof so that the cards may be flexed or bent to permit the slots to be passed over and straddle the shanks of the eyelets 3 and partake of the positions shown in Figure 1. When in such positions they will be supported on the head-piece 1 until said cards are manually flexed to disengage them from the studs or eyelets.

If it is only desired to support two cards, the construction will be complete as described. However, if it is desired to support additional cards, the head-piece may either be made wider and additional pairs of eyelets associated therewith, or such additional cards may be suspended from the cards 7 and 8 already mounted on the head piece. The latter construction is preferred and is rendered possible by providing each of the cards 7 and 8 with eyelets or studs 9—10, 9—10 at their lower corners, as clearly shown in Figure 1, and the additional cards 7′, 8′, constructed in the same manner as the cards 7 and 8, may be supported at these eyelets or studs in the same manner as the cards 7 and 8 are supported on the head piece. For the purpose of illustration, the card 8′ is shown as removed, while the card 7′ is illustrated as mounted on the card 7. A number of cards, identical in construction with the card 7, may be successively mounted upon one another so as to build up an assembly of any desired length. The same is true with reference to the card 8, and while the head piece 1 is shown as capable of supporting two sets of cards, it may be made of such width as to support only one set of cards or any number of sets.

An assembly of the character shown in Figure 1 may be utilized as a telephone list, address list, or for any other purpose, each card bearing such information as may be desired and all of the cards collectively cooperating to give full information on some particular subject. Moreover, such construction may be employed to exhibit merchandise, different articles, such as cuff links, being supported on the various cards. This manner of displaying merchandise is highly practical and efficient, since any particular card may be removed and the merchandise sold therewith, and the remaining cards be left in place on the head piece 1.

In Figures 3 and 4 I have illustrated a slightly modified form of construction. In this showing the cards 7, 7′, 7², 7³ and 7⁴ are made substantially the same as the cards shown in Figure 1, except that they are made somewhat narrower and are of celluloid or other springy transparent material. Between the overlapping portions of the successive cards or strips are positioned strips of paper or other suitable material 11, 11′, 11², etc., containing written or printed matter which may be seen through those portions of the next adjacent strip which overlie such printed matter. When the device is built up in this manner and constructed of celluloid as described, the parts may be assembled and dismantled the same as described with reference to Figure 1, but the construction of Figures 3 and 4 has the advantage that the written matter is covered or protected by transparent material and is thus precluded from becoming soiled or worn. The construction disclosed in Figures 3 and 4 may be employed for telephone lists, directory lists, membership lists, or for many other purposes.

It will be noted that in this construction both faces of the device may be used for the lists and both will present exterior celluloid coverings for the matter contained on the strips 11, 11′, 11², etc. Similarly, both faces of the construction shown in Figure 1 may be utilized to contain written, printed or other matter, if the device is to be used as a list for telephone numbers, addresses, etc.

The assembly illustrated in Figure 5 differs in several respects from the two prior embodiments. In this construction a sheet of material 14 is provided with a plurality of pairs of studs 3—4, 3—4, etc., which are rigidly mounted on the sheet 14, and with each pair of studs a slotted resilient strip is adapted for cooperation. Four such strips 7, 7′, 7² and 7³ are shown, and these strips may be individually mounted on the part 14. In practice, the part 14 may be of glass or celluloid, and the strips referred to may be letters, so that when assembled after the manner shown in Figure 5, a sign will be formed, showing in the present instant the word Cake. The present invention, however, does not require that the part 14 be transparent. In practice, it may be opaque, and the letters may be formed on the opposite sides of the strip.

In the construction of Figure 6, I have illustrated another device embodying the present invention, the part 15 is rigid and the part 16 is of celluloid or other flexible material. The corresponding ends of the two strips are riveted or secured together by eyelets 17 which pass through perforations in both parts and are headed over to secure said parts together. At the opposite end, the part 15 is provided with two studs 3 and 4 and the part 16 is slotted as shown at 5 and 6 in Figure 6, whereby these slots may be moved into and out of cooperative relation with the studs 3 and 4, respectively, to attach or release one end of the part 16 from the part 15. The strip 11 of any suitable material may be interposed between the parts 15 and 16 and both the parts 15 and 16 may be made transparent so that both surfaces of the strip 11 are exposed to view.

It will be apparent from the foregoing detailed description that the invention is susceptible to many modifications and may be used for a great diversity of purposes.

The manner of interlocking one part with a stud carried by the other part is highly useful, not only in the constructions of the device shown in the drawings but in many other practical devices. Accordingly, I wish it understood that the invention is not restricted to the specific illustrations in the drawings but is as broadly novel as is commensurate with the appended claims.

In the following claims, I have used the expression "stud" to describe the parts 3, 4, 9 and 10, etc., which are shown in the drawings as eyelets. I wish it understood that the word is used in the claims in a generic manner and that this terminology does not exclude equivalents. In other words, I consider eyelets, rivets, grommets, nails and other analagous devices as coming under the head of "studs" broadly.

Having thus fully described the invention, what I claim as new and desire to secure by Letters Patent, is:

1. An assembly of the character described embodying a plurality of strips, each of which is provided adjacent two juxtaposed corners with slots extending towards one another from the opposite ends of the strip, and studs positioned adjacent the other two corners of each strip and extending forwardly from the face of such strip, whereby the slots of consecutive strips may be brought into cooperative relation with the studs of preceding strips to produce a detachable assembly.

2. A display device embodying a head piece provided with at least two forwardly projecting studs, in combination with a plurality of strips, each of which is provided at two of its adjacent corners with oppositely extending slots, and at its two other adjacent corners with forwardly projecting studs, the studs and slots of all of the strips being similarly positioned with reference to one another and to the studs on the head piece, whereby the slots of one of the strips may be brought into cooperative relation with the studs of the head piece and thereafter the slots of each of the remaining strips brought into cooperative relation with the studs of the preceding strip for the purpose of mounting all of the strips on the head piece.

3. A display device embodying a plurality of strips, each of which is provided at two of its adjacent corners with oppositely extending slots, and at its two other adjacent corners with forwardly projecting studs, whereby the several strips may be consecutively secured together by bringing the slots of each successive strip into cooperative relation with the studs of the preceding strip.

4. A display device embodying a plurality of strips, each of which is provided at two of its adjacent corners with oppositely extending slots, and at its two other adjacent corners with forwardly projecting studs, whereby the several strips may be consecutively secured together by bringing the slots of each successive strip into cooperative relation with the studs of the preceding strip, said strips being transparent, whereby the part of each preceding strip which is overlapped by the next succeeding strip may be seen through such succeeding strip.

5. A display device embodying a plurality of strips, each of which is provided at two of its adjacent corners with oppositely extending slots, and at its two other adjacent corners with forwardly projecting studs, whereby the several strips may be consecutively secured together by bringing the slots of each successive strip into cooperative relation with the studs of the preceding strip, said strips being transparent, whereby the part of each preceding strip which is overlapped by the next succeeding strip may be seen through such succeeding strip, and strips of opaque material adapted to contain printed or written matter positioned between the overlapping portions of the strips.

6. A display device unit embodying a bendable piece of material provided with a plurality of studs projecting from one face thereof and also provided with a corresponding number of correspondingly shaped slots extending in opposite directions from one another whereby a number of such units may be assembled by bending the successive units to bring the slots of each successive unit into cooperative relation with the studs of the preceding unit.

In testimony whereof I have signed the foregoing specification.

ALFRED DE MEURISSE.